United States Patent [19]

Inuzuka

[11] 4,121,813

[45] Oct. 24, 1978

[54] VIBRATION CONTROL BUSH ASSEMBLY

[75] Inventor: Yutaka Inuzuka, Toyota, Japan

[73] Assignee: Toyota Jidosha Kogyo Kabushiki Kaisha, Toyota, Japan

[21] Appl. No.: 780,821

[22] Filed: Mar. 24, 1977

[30] Foreign Application Priority Data

Mar. 24, 1976 [JP] Japan .............................. 51-35533[U]

[51] Int. Cl.$^2$ ............................................. F16F 1/38
[52] U.S. Cl. .............................. 267/57.1 A; 188/1 B;
248/10; 248/358 R; 267/63 A; 267/153;
308/238
[58] Field of Search ................... 188/1 B; 267/57.1 R,
267/57.1 A, 54 A, 153, 63 A, 63 R; 308/238, 26;
248/358 R, 274, 22, 9, 10

[56] References Cited

U.S. PATENT DOCUMENTS 3,508,745   4/1970   Deane .............................. 267/57.1 R

FOREIGN PATENT DOCUMENTS 1,361,484   2/1974   United Kingdom .............. 267/57.1 A

*Primary Examiner*—George E. A. Halvosa
*Attorney, Agent, or Firm*—Stevens, Davis, Miller & Mosher

[57] ABSTRACT

A bush assembly for vibration control, particularly adapted for use in supporting a suspension arm of an automobile suspension system, which includes an inner cylinder and an outer cylinder which is smaller in length than the inner cylinder. The outer cylinder coaxially encircles the inner cylinder and is radially spaced therefrom to define a cylindrical clearance space encircling the inner cylinder. A generally cylindrical impact absorbing member of elastic material is secured in the cylindrical space and has at least a pair of diametrically opposite recesses facing the inner peripheral surface of the outer cylinder. Each of the recesses has an arcuate transverse cross section and extends along the length of the outer cylinder. The impact absorbing member has a portion of rectangular longitudinal cross section interposed between each of its recesses and the inner cylinder and having a length substantially equal to that of the outer cylinder. The impact absorbing member has a pair of radially outwardly tapered portions of trapezoidal longitudinal cross section interposed circumferentially between the recesses, and having an inner axial length substantially equal to the length of the inner cylinder and an outer axial length smaller than the length of the outer cylinder.

2 Claims, 7 Drawing Figures

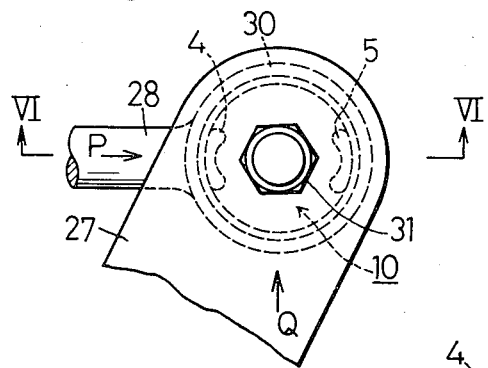
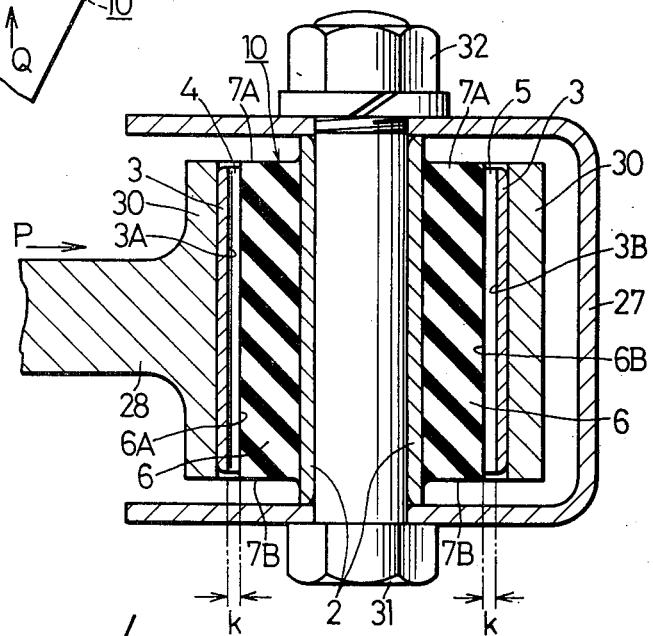
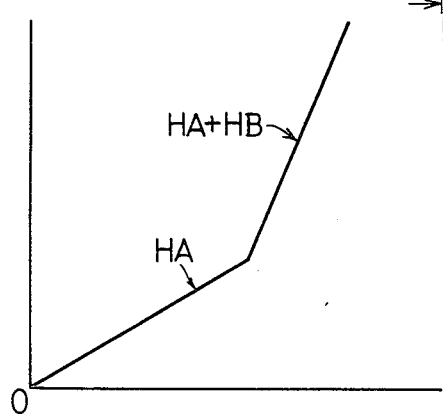

VIBRATION CONTROL BUSH ASSEMBLY

This invention relates to a cylindrical bush assembly for vibration control, and more particularly, to a vibration control bush adapted for use with a suspension arm in an automobile suspension system.

For use with a suspension arm in an automobile suspension system, for example, there is known a vibration control bush which comprises a hollow cylindrical body made of homogeneous rubber material. The bush is received in an end aperture of the suspension arm and has an axial bore through which an arm mounting pin extends. The bush must be able to damp vibration caused by road irregularities. It must also be capable of enduring repeated application of load due to such vibration. In order to improve the vibration control capacity of such a bush, however, it must be designed so as to have a low spring rate or a greater deflection under a given load, with a resultant reduction in its durability. On the other hand, its durability can be improved only at the sacrifice of its vibration control capacity because its spring rate must be increased for that purpose. Thus, it has been difficult to obtain a bush which is satisfactory in both its vibration control capacity and durability within a limited dimensional range available for such a bush. In an attempt to provide a solution to that problem, there has been proposed a bush of partly hollow wall construction intended for producing a non-linear spring rate. This bush has also been unsatisfactory because of its failure to provide a desired spring rate and its inferior durability.

An object of the present invention is to provide an improved bush for vibration control having a non-linear spring rate characterized by a relatively large deflection in a small load range and a relatively small deflection in a large load range.

Another object of the present invention is to provide an improved bush for vibration control which is capable of effective vibration control over a reasonably long period of time for any particular application for which it is used.

Still another object of the present invention is to provide an improved bush for vibration control which can absorb axial torsion without lowering the spring rate in the radial direction.

Yet another object of the present invention is to provide an improved bush for vibration control which is easy and inexpensive to manufacture and mount in a selected position.

These objects are attained by the present invention providing a cylindrical bush assembly for vibration control comprising an inner cylinder; an outer cylinder coaxially encircling said inner cylinder and radially spaced apart therefrom to define a cylindrical clearance space encircling said inner cylinder, said inner cylinder being greater in length than said outer cylinder; and a generally cylindrical impact absorbing member of elastic material secured in said cylindrical clearance space and having at least a pair of diametrically opposite recesses facing the inner peripheral surface of said outer cylinder, each of said recesses having an arcuate transverse cross section and extending along the length of said outer cylinder, said impact absorbing member having a rectangular longitudinal cross section in a portion between each of said recesses and said inner cylinder, and a trapezoidal longitudinal cross section in a portion between said recesses, said last mentioned portion being radially outwardly tapered and having an inner peripheral portion substantially equal in length to said inner cylinder and an outer peripheral portion smaller in length than said outer cylinder.

The bush assembly of this invention presents a relatively low spring rate to produce effective vibration control until a sufficiently high load is applied at which point the assembly, the outer cylinder abuts against the bottom of one of the recesses in the impact absorbing member, and after such abutment, its spring rate increases to produce excellent durability.

Because of the trapezoidal longitudinal cross section of the impact absorbing member, the spring rate of the bush against axial torsion can independently be lowered without lowering its spring rate in the radial direction.

According to the present invention, the recesses formed peripherally on a single impact absorbing member effectively provide a non-linear spring rate which has hitherto been obtained only by using a plurality of impact absorbing members of different elasticity between inner and outer cylinders.

The invention will now be described in further detail by way of example with reference to the accompanying drawings, in which:

FIG. 5 is a fragmentary, enlarged view of FIG. 4 illustrating the bush applied to one end of a suspension arm;

FIG. 6 is an enlarged sectional view taken along the line VI — VI of FIG. 5; and FIG. 7 is a graph showing a typical example of the spring rate obtained by the bush of FIG. 1.

Figure 1:
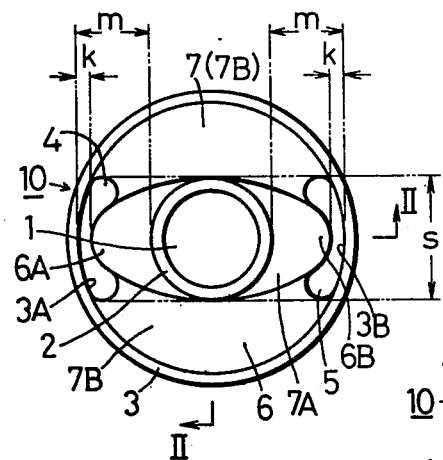
FIG. 1 is a side elevational view of a preferred embodiment of the present invention.
Figure 2:
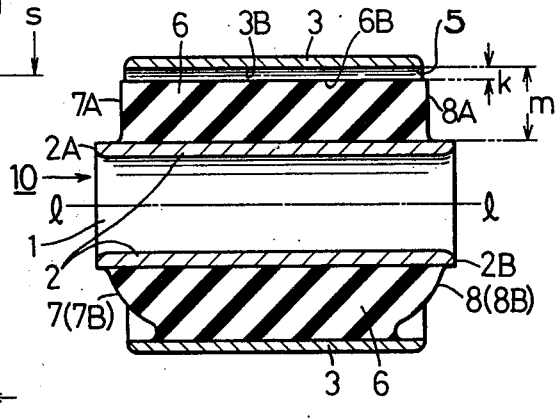
FIG. 2 is a longitudinal sectional view taken along the line II — II of FIG. 1.
Figure 3:
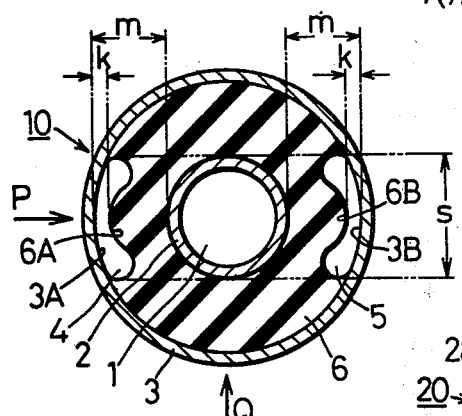
FIG. 3 is a transverse sectional view of the bush shown in FIG. 2.

Referring now to FIGS. 1 to 3 of the drawings, there is shown a bush assembly of the double-cylindrical construction, generally indicated at 10, according to a preferred embodiment of this invention. The bush assembly 10 comprises an inner cylinder 2 including an axial bore 1 therethrough having an axis defining the longitudinal axis $l$ of the bush assembly 10 and an outer cylinder 3 coaxially encircling the inner cylinder 2. The outer cylinder 3 is somewhat smaller in length than the inner cylinder 2, and the inner cylinder 2 has a pair of opposite end projections of equal length extending beyond the opposite ends of the outer cylinder 3 as shown in FIG. 2.

The outer cylinder 3 is considerably greater in diameter than the inner cylinder 2 and defines a cylindrical clearance space encircling the inner cylinder 2 and having a relatively large radial width as indicated at $m$. A generally cylindrical impact absorbing member 6 of elastic material, such as rubber, is secured in the cylindrical clearance space $m$ and is provided with a pair of recesses 4 and 5 facing a pair of diametrically opposite inner peripheral portions 3A and 3B, respectively of the outer cylinder 3. The recesses 4 and 5 extend along the entire length of the outer cylinder 3 as shown at 5 in FIG. 2. The recesses 4 and 5 each have a circumferential width preferably slightly greater than the outside diameter $s$ of the inner cylinder 2. The recesses 4 and 5 each have an arcuate cross sectional shape having a radial width which is smaller than the cylindrical clearance space m, and which varies along the inner surface 3A or 3B. The radial width of each recess is smallest at its middle portion as shown at k in FIG. 3. The smallest radial width k of the recesses 4 and 5 is defined by a pair of diametrically opposite, arcuate, radially outwardly projecting portions 6A and 6B formed on the impact absorbing member 6 as shown in FIG. 3. The portions 6A and 6B each serve as a stop or abutment against the inner peripheral surface of the outer cylinder 3 when the latter is displaced under load relative to the inner cylinder 2.

At each of opposite ends 7 and 8 of the impact absorbing member 6, there is formed an oval flat area 7A or 8A with the outside diameter s of the inner cylinder 2 as the minor axis and the distance between the projections 6A and 6B as the line of apsides. The oval areas 7A and 8A have flat surfaces perpendicular to the longitudinal axis $l$ and slightly project beyond the opposite ends of the outer cylinder 3. The opposite ends 7 and 8 of the absorbing member 6 also includes inclined surfaces 7B and 8B formed between the recesses 4 and 5 and tapered radially outwardly toward the outer cylinder 3. In this tapered portion, the absorbing member 6 has an inner peripheral portion slightly smaller and substantially equal in length to the inner cylinder 2, and an outer peripheral portion considerably smaller in length than the outer cylinder 3.

The impact absorbing member 6 is bonded to the inner and outer cylinders 2 and 3 by vulcanization.

Although the recesses 4 and 5 are provided as facing each other in a horizontal plane in the embodiment of the drawings, an additional pair or pairs of recesses may be formed to face each other in a vertical plane or otherwise.

The inner cylinder 2 has a pair of opposite ends 2A and 2B notched to prevent rotation of the inner cylinder and, hence, the bush assembly 10 when the latter is installed as shown in FIG. 6.

Figure 4:
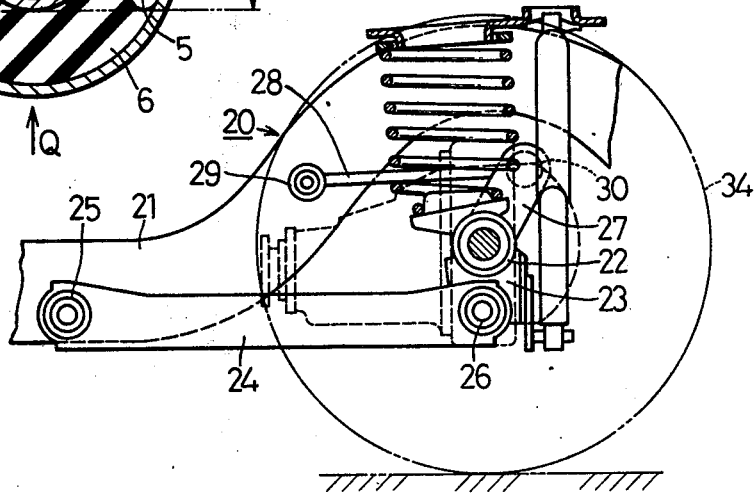
FIG. 4 is a fragmentary, diagrammatic illustration of the rear suspension system of an automobile in which the bush of FIG. 1 is mounted.

Attention is now directed to FIG. 4 illustrating a typical example of application of the vibration control bush according to this invention. FIG. 4 fragmentarily shows the rear suspension system 20 of an automobile which includes a lower suspension arm 24 carried at one end 25 on a frame 21 and supported at the other end 26 by a bracket 23 on an axle housing 22, and an upper suspension arm 28 having opposite ends 29 and 30 supported respectively by the frame 21 and another bracket 27 on the axle housing 22.

As shown in FIGS. 5 and 6, the bush assembly 10 is, for example, inserted in one end 30 of the upper suspension arm 28 with the recesses 4 and 5 located in a horizontal plane, and a bolt 31 and a nut 32 tightening the bolt 31 against the bracket 27 provide a secure support for the end 30 and the bush assembly 10 mounted therein relative to the bracket 27.

A load bearing on a rear wheel 34 in a direction generally longitudinal of the automobile is transmitted to the upper arm 28 along the longitudinal axis thereof, and the upper suspension arm 28 may be caused to move in the direction indicated by an arrow P in FIG. 6. The arm 28 displaces the outer cylinder 3 transversely, i.e., to the right in FIG. 6, and until the inner surface 3A of the outer cylinder 3 contacts the portion 6A of the impact absorbing member 6, the load in the direction P is absorbed by the impact absorbing member 6 mainly through the shearing deformation of its upper and lower portions. If the load is further increased, the outer cylinder 3 is further displaced in the direction of the arrow P until the inner surface 3A of the outer cylinder 3 compresses the impact absorbing member 6 in the vicinity of its portion 6A against the inner cylinder 2. The increased load is thus absorbed by compression deformation of the impact absorbing member 6, as well as by the aforementioned shearing deformation.

FIG. 7 shows a graph showing a typical example of the spring rate obtained by the bush assembly 10. As shown in FIG. 7, the bush assembly 10 presents a non-linear spring rate, which is low under a small load and high under a large load. Since the bush assembly 10 has such a non-linear spring rate, all wind-up vibration of wheels having a relatively small amplitude and a relatively high frequency caused by road irregularities or changes in engine torque is effectively absorbed by the bush assembly 10 through its shearing deformation as indicated at HA in FIG. 7 and no such wind-up vibration is transmitted to the body of the automobile. Further, wind-up vibration of the wheels having a relatively large amplitude and a relatively low frequency caused by clutch judder, brake judder or road irregularities is substantially prevented as it is absorbed by the bush assembly 10 through its combined shearing and compressive deformation as indicated at HA + HB in FIG. 7.

As is apparent from the foregoing description, any stress caused by the shearing deformation of the member 6 is mainly imparted to its upper and lower portions as viewed in, for example, FIG. 3, while the stress by the compressive deformation of the member 6 is imparted to its right and left portions. Therefore, no localized development of excessive stress takes place around the inner cylinder 2 where the bush 10 has the least strength. Thus, the bush 10 has an excellent overall strength and durability.

The rear wheel 34 may also be subjected to a load developed in the direction indicated by an arrow Q in FIG. 3, though it may be considerably smaller than that developed in the direction of the arrow P. The vibration in this direction is damped in proportion to the compression of the lower portion of the impact absorbing member 6, as in this case, the bush shows a linear spring rate, though not graphically shown.

It is, alternatively, possible to provide an additional pair of recesses in the upper and lower portions of the member 6 to obtain a non-linear spring rate in a vertical direction, too.

Apart from the above mentioned vibration in the directions of the arrows P and Q, the upper suspension arm 28 may also be caused to rotate to some extent about the bolt 31, and thus, the bush assembly 10 may be subjected to a corresponding torsion around the bolt 31. However, since the bush assembly 10 has a large free area at each of its ends 7 and 8, it can easily resist any otherwise possible undesirable torsional deformation.

Further, when the rear wheels 34 undergo different phases of vibration due to road irregularities or changes in the mode of engagement of differential gears, the upper suspension arm 28 is loaded with a torsional torque and the bush assembly 10 may vibrate along its axis $l$.

Since the impact absorbing member 6 has a substantially trapezoidal longitudinal cross section and is smaller in length than the outer cylinder 3 at its outer peripheral portion contacting the outer cylinder 3, the spring rate of the member 6 can independently be lowered without lowering the spring rate of the portions 6A and 6B. Thus, the bush can satisfactorily absorb any radial and axial strain and provide an excellent vibration control capacity and durability. When an excessive vibratory load is applied to the bush, the inner surface of the outer cylinder 3 is gradually brought into contact with an increasing area of the outer peripheral surface of the member 6, so that the bush obtains a non-linearly increasing spring rate and prevents excessive rear wheel vibration.

Since the absorbing member 6 is bonded to the inner and outer cylinders 2 and 3 by vulcanization, any vibrations in vertical and horizontal directions and torsion about and along the axis $l$ are all effectively controlled, without causing any detachment of the impact absorbing member 6 from the inner and outer cylinders 2 and 3. The circumferential widths of the recesses 4 and 5 and the shapes of the clearance $k$ and the portions 6A and 6B may be changed to obtain a desired non-linear spring rate at need.

The circumferential widths of the recesses 4 and 5 are preferably greater than the outside diameter $s$ of the inner cylinder 2 to obtain a sufficient non-linear spring rate.

While the invention has been described with reference to a preferred embodiment thereof, it is to be understood that modifications or variations may be easily made without departing from the scope of this invention which is defined by the appended claims.

What is claimed is:

1. A cylindrical bush assembly for vibration control comprising an inner cylinder; an outer cylinder coaxially encircling said inner cylinder and radially spaced apart therefrom to define a cylindrical clearance space encircling said inner cylinder, said inner cylinder being greater in length than said outer cylinder; a generally cylindrical impact absorbing member of elastic material secured in said cylindrical clearance space and having at least a pair of diametrically opposite recesses facing the inner peripheral surface of said outer cylinder, each of said recesses having an arcuate transverse cross section and extending along substantially the full length of said outer cylinder, said impact absorbing member having a rectangular longitudinal cross section in a portion between each of said recesses and said inner cylinder, and a trapezoidal longitudinal cross section in a portion between said recesses, said last mentioned portion being radially outwardly tapered and having an inner peripheral portion substantially equal in length to said inner cylinder and an outer peripheral portion smaller in length than said outer cylinder, said arcuate transverse cross section having a circumferential width at least equal to the outside diameter of said inner cylinder and a varying radial width narrowest at the middle portion of said arcuate section thereof, said middle portion having an axial length substantially equal to the length of said outer cylinder, whereby said middle portion is engageable with said outer cylinder upon loaded conditions of said assembly to produce a non-linear spring rate for said assembly.

2. The invention as defined in claim 1 wherein said impact absorbing member is formed at each end thereof with an oval flat area encircling said inner cylinder and extending between said recesses, said oval areas defining a pair of elongate abutments extending along said middle portion and facing said inner peripheral surface of said outer cylinder.

* * * * *